United States Patent
Shim et al.

(10) Patent No.: US 10,705,614 B2
(45) Date of Patent: Jul. 7, 2020

(54) METHOD AND APPARATUS FOR GENERATING VIBRATION PATTERNS

(71) Applicant: Samsung Electronics Co., Ltd., Suwon-si, Gyeonggi-do (KR)

(72) Inventors: Sangwon Shim, Incheon (KR); Joonsung Han, Anyang-si (KR); Minkoo Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/002,905

(22) Filed: Jun. 7, 2018

(65) Prior Publication Data

US 2018/0356892 A1 Dec. 13, 2018

(30) Foreign Application Priority Data

Jun. 7, 2017 (KR) .................. 10-2017-0070983

(51) Int. Cl.
*G06F 3/01* (2006.01)
*G06F 3/0362* (2013.01)
*G06F 3/0481* (2013.01)
*G08B 6/00* (2006.01)
*G06F 3/0484* (2013.01)

(52) U.S. Cl.
CPC ............ *G06F 3/016* (2013.01); *G06F 3/0362* (2013.01); *G06F 3/04817* (2013.01); *G06F 3/04847* (2013.01); *G08B 6/00* (2013.01)

(58) Field of Classification Search
CPC .... G06F 3/016; G06F 3/04817; G06F 3/0362; G06F 3/04847; G08B 6/00
See application file for complete search history.

(56) References Cited

U.S. PATENT DOCUMENTS

| | | | |
|---|---|---|---|
| 10,395,128 B2* | 8/2019 | Van Os | G06K 9/00255 |
| 10,416,767 B2* | 9/2019 | Nakamura | A63F 13/285 |
| 2006/0175929 A1* | 8/2006 | Sawada | G04C 3/12 310/312 |
| 2008/0294984 A1* | 11/2008 | Ramsay | G06F 1/1626 715/702 |
| 2009/0322498 A1* | 12/2009 | Yun | G06F 3/016 340/407.2 |
| 2012/0306632 A1* | 12/2012 | Fleizach | G06F 3/016 340/407.2 |

(Continued)

FOREIGN PATENT DOCUMENTS

| | | |
|---|---|---|
| KR | 10-1468250 B1 | 12/2014 |
| KR | 10-2016-0083690 A | 7/2016 |

*Primary Examiner* — Ibrahim A Khan

(57) ABSTRACT

An electronic device may include: a rotation detection module configured to detect rotation parameters of a rotating body; a haptic module configured to generate vibration according to a vibration pattern; a display configured to display a user interface; a memory; and a processor electrically connected with the rotation detection module, the haptic module, the display, and the memory. The memory may store instructions that, when executed, cause the processor to: determine vibration parameters based on the rotation parameters detected by the rotation detection module; generate a vibration pattern based on the vibration parameters; and output a user interface corresponding to the generated vibration pattern on the display.

14 Claims, 13 Drawing Sheets

(56) References Cited

U.S. PATENT DOCUMENTS

| | | | |
|---|---|---|---|
| 2013/0174092 A1* | 7/2013 | Li ......................... | G06F 3/0482 |
| | | | 715/823 |
| 2013/0229339 A1* | 9/2013 | Takahata ................. | G06F 3/016 |
| | | | 345/156 |
| 2014/0129932 A1* | 5/2014 | Ali ..................... | G06Q 30/0643 |
| | | | 715/702 |
| 2014/0139637 A1* | 5/2014 | Mistry .................. | G06F 3/0304 |
| | | | 348/46 |
| 2016/0179353 A1* | 6/2016 | Iskander ............ | G06F 3/04817 |
| | | | 715/765 |
| 2016/0259416 A1* | 9/2016 | Birnbaum .............. | G04G 21/08 |
| 2017/0090572 A1* | 3/2017 | Holenarsipur ........ | G06F 3/0362 |
| 2017/0228028 A1* | 8/2017 | Nakamura ............. | G06F 3/014 |
| 2017/0262080 A1* | 9/2017 | Armstrong ............. | G06F 3/016 |
| 2017/0371431 A1 | 12/2017 | Kim et al. | |
| 2018/0005496 A1* | 1/2018 | Dogiamis ............... | G06F 1/163 |
| 2018/0217682 A1* | 8/2018 | Dangy Caye ........ | G06F 3/0488 |
| 2019/0025768 A1* | 1/2019 | Dangy Caye ......... | G04G 21/08 |

\* cited by examiner

METHOD AND APPARATUS FOR GENERATING VIBRATION PATTERNS

CROSS-REFERENCE TO RELATED APPLICATIONS AND CLAIM OF PRIORITY

This application is based on and claims priority under 35 U.S.C. § 119 to Korean Patent Application No. 10-2017-0070983 filed on Jun. 7, 2017 in the Korean Intellectual Property Office, the disclosure of which is incorporated herein by reference in its entirety.

BACKGROUND

1. Field

Various embodiments of the present disclosure relate to a method and apparatus that generate vibration patterns to provide haptic feedback to the user.

2. Description of Related Art

Haptics is a technology that enables a user using an electronic device to feel the tactile sense. Haptics is widely applied to electronic devices together with visual and auditory feedback.

Haptic feedback can improve and simplify the user interface. Particularly, haptic feedback is effective in notifying the user of a specific event. For such haptic feedback, manufacturers of electronic devices provide preset vibration patterns so that the electronic devices may vibrate in specific patterns.

However, when haptic feedback is provided according to a vibration pattern preset by the manufacturer, there is a limit to handling various events occurring in the electronic device. This may make it difficult for the user to identify different events with haptic feedback.

SUMMARY

The present disclosure has been made in view of the above problem. Accordingly, an aspect of the present disclosure is to provide a user interface that allows the user to adjust the vibration pattern so that the user can identify various events with only haptic feedback.

In accordance with an aspect of the present disclosure, there is provided a method for an electronic device to generate a vibration pattern. The method may include: identifying rotation parameters of a rotating body; determining vibration parameters based on the identified rotation parameters; generating a vibration pattern based on the vibration parameters; and displaying a user interface corresponding to the generated vibration pattern on a display.

The display may be circular. The rotating body may be disposed at the outer periphery of the display and be arranged to be rotatable along the outer periphery.

The rotation parameters may include at least one of the rotation direction, rotation angle, rotational speed, rotational acceleration, and rotation length of the rotating body.

The vibration parameters may include at least one of the vibration duration, vibration strength, vibration type, vibration period, and vibration frequency for the electronic device.

The method may further include identifying the rotation duration of the rotating body. The vibration duration of the electronic device may be determined based on the identified rotation duration of the rotating body.

The user interface may include a circular arc whose radius is smaller than the radius of the rotating body. The length of the arc may be determined based on the vibration duration of the electronic device.

The method may further include displaying a play button on the display. The electronic device may be configured to vibrate or not vibrate according to the generated vibration pattern in response to a user input for selecting the play button.

In accordance with another aspect of the present disclosure, there is provided an electronic device. The electronic device may include: a rotation detection module configured to detect rotation parameters of a rotating body; a haptic module configured to generate vibration according to a vibration pattern; a display configured to display a user interface; a memory; and a processor electrically connected with the rotation detection module, the haptic module, the display, and the memory. The memory may store instructions that, when executed, cause the processor to: determine vibration parameters based on the rotation parameters detected by the rotation detection module; generate a vibration pattern based on the vibration parameters; and output a user interface corresponding to the generated vibration pattern on the display.

The display may be circular. The rotating body may be disposed at the outer periphery of the display and be arranged to be rotatable along the outer periphery.

The rotation parameters may include at least one of the rotation direction, rotation angle, rotational speed, rotational acceleration, and rotation length of the rotating body.

The vibration parameters may include at least one of the vibration duration, vibration strength, vibration type, vibration period, and vibration frequency for the electronic device.

The memory may store instructions that, when executed, cause the processor to: identify the rotation duration of the rotating body; and determine the vibration duration of the electronic device based on the identified rotation duration of the rotating body.

The user interface may include a circular arc whose radius is smaller than the radius of the rotating body. The length of the arc may be determined based on the vibration duration of the electronic device.

The memory may store instructions that, when executed, cause the processor to: display a play button on the display; and control, in response to a user input for selecting the play button, the haptic module to vibrate or not vibrate the electronic device according to the generated vibration pattern.

In accordance with another aspect of the present disclosure, there is provided an electronic device. The electronic device may include: a circular display configured to output a user interface; a rotating body disposed at the outer periphery of the circular display and arranged to be rotatable along the outer periphery of the circular display; a rotation detection module positioned inside the rotating body and configured to detect the rotation angle of the rotating body; and a processor electrically connected with the circular display and the rotation detection module, and configured to control activating a specific function for a time duration corresponding to the rotation angle of the rotating body on the basis of a user input for selecting the user interface and the output from the rotation detection module.

In accordance with another aspect of the present disclosure, there is provided an electronic device. The electronic device may include: a circular display configured to output a user interface; a rotating body disposed at the outer periphery of the circular display and arranged to be rotatable along the outer periphery of the circular display; a rotation detection module positioned inside the rotating body and configured to detect the rotation angle of the rotating body; and a processor electrically connected with the circular display and the rotation detection module, and configured to control activating a specific function at a time point corresponding to the rotation angle of the rotating body on the basis of a user input for selecting the user interface and the output from the rotation detection module.

In a feature of the present disclosure, the user can adjust the vibration parameters by using a physical input means such as a rotating body. Thereby, it is possible to generate an intuitively expected vibration pattern.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
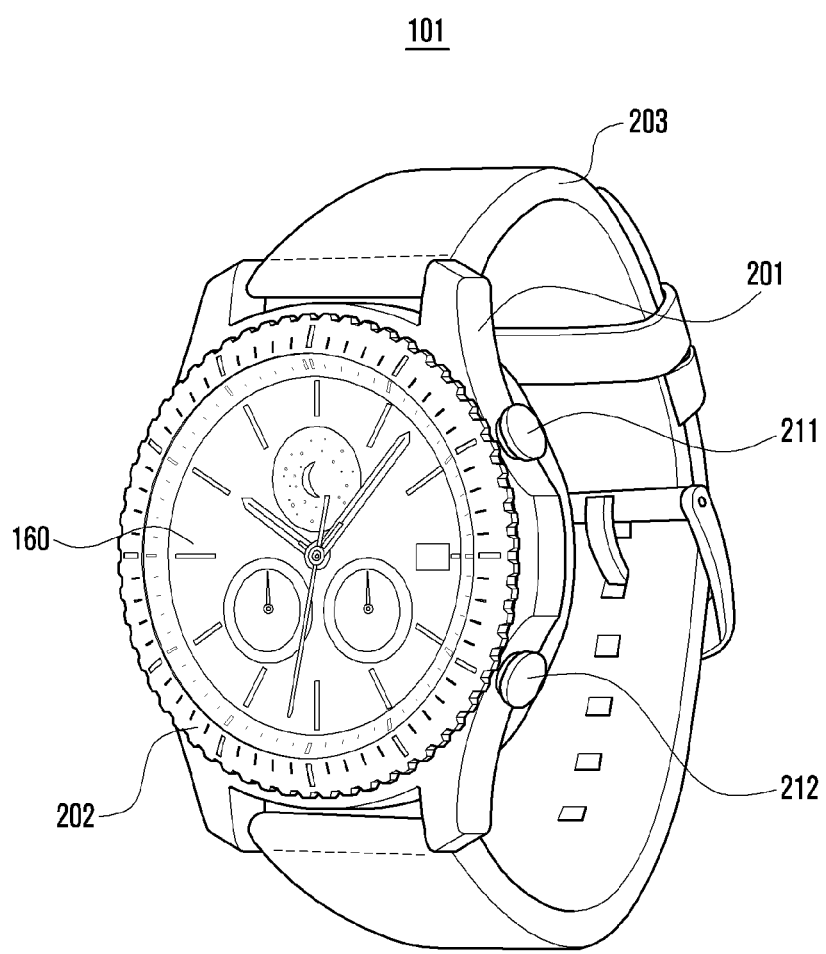
FIG. 1 shows an electronic device according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description is made with reference to the accompanying drawings and is provided to assist in a comprehensive understanding of various example embodiments of the present disclosure as defined by the claims and their equivalents. It includes various specific details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, may simply be used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" may generally denote that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in the present disclosure may refer, for example, to the presence of the disclosed functions, operations, and constituent elements and do not limit one or more additional functions, operations, and elements. In an example embodiment of the present disclosure, the terms, such as "include" and/or "have" may be understood to refer, for example, to a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In an example embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions.

FIG. 1 shows an electronic device according to an embodiment of the present disclosure.

In FIG. 1, a display 160, a housing 201, a rotating body 202, and rotation knobs 211 and 212 are shown.

The electronic device 101 may be, but not limited to, a wearable device that can be worn on the wrist.

The display 160 may be implemented as a touchscreen and may receive user input. The display 160 may display a user interface (UI) or a graphical object, thereby providing information to the user or receiving user input. For example, the display 160 may display a graphical object corresponding to the vibration pattern generated by the user.

The rotating body 202 is a bezel surrounding the outer portion of the display 160, and may be a bezel ring in the form of a ring. The rotating body 202 may be rotated with respect to the housing 201. The rotating body 202 may be rotated clockwise or counterclockwise, and its rotation may be limited to a maximum of 360 degrees or may be not limited.

The rotating body 202 may include a specific pattern or a specific shape to provide information about the rotation. For example, the rotating body 202 may include a plurality of openings formed at regular intervals, and the electronic device 101 can detect the rotation of the rotating body 202 through the openings. In one embodiment, the rotating body 202 can maintain its rotated position via a locking member (e.g., detent) disposed at the housing 201. When the user rotates the rotating body 202, the locking member may provide the user with a feeling of jamming (e.g., clicking) every constant rotation angle.

The rotation knob 211 or 212 is a rotatable object, and can be disposed on the side portion of the housing 201. As the rotation knob 211 or 212 is rotated, the corresponding function of the electronic device can be performed. For example, as the user rotates the rotation knobs 211 and 212, the clock hands displayed on the display 160 can be rotated.

The rotating body 202 and the rotation knobs 211 and 212 may be included in the input unit.

The housing 201 constitutes the appearance of the electronic device 101, and the display 160 can be disposed on the front face of the housing 201. The rotation knobs 211 and 212 may be disposed on the side portion of the housing 201. Various electronic components may be arranged in the inner space of the housing 201. For example, the sensor module and the rotation detection module may be disposed inside the housing 201. In a certain embodiment, the sensor module may include the rotation detection module. The rotation detection module can measure the rotation parameters (e.g., rotation direction, rotation angle, rotation length, rotation speed, and rotation acceleration) of the rotating body 202.

Figure 2:
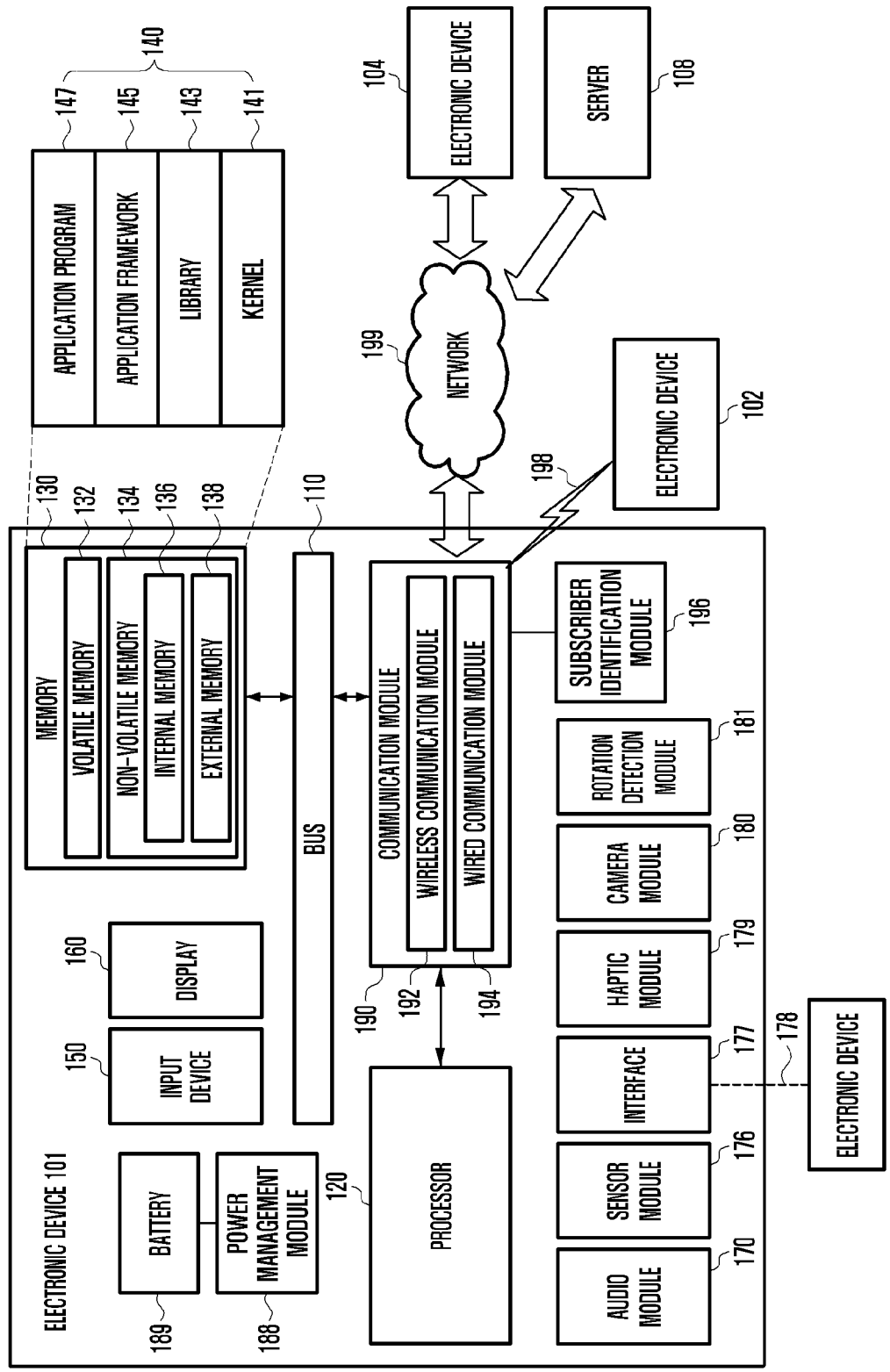
FIG. 2 illustrates a block diagram of the electronic device in a network environment according to an embodiment of the present disclosure.

FIG. 2 is a block diagram illustrating an electronic device 101 in a network environment according to various embodiments. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

Referring to FIG. 2, the electronic device 101 in the network environment may communicate with an electronic device 102 via a short-range wireless communication network 198, or an electronic device 104 or a server 108 via a long-range wireless communication network 199. According to an embodiment, the electronic device 101 may communicate with the electronic device 104 via the server 108.

According to an embodiment, the electronic device 101 may include a bus 110, a processor 120, memory 130, an input device 150, a display device 160, an audio module 170, a sensor module 176, an interface 177, a haptic module 179, a camera module 180, a rotation detection module 181, a power management module 188, a battery 189, a communication module 190, or a subscriber identification module (SIM) 196.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input device 150, the display 160, the communication module 190, and the like) through the bus 110, may interpret the received commands, and may execute calculation or data processing according to the interpreted commands. Although illustrated as one element, the processor 120 may include multiple processors without departing from the teachings herein.

The memory 130 may include the volatile memory 132 or the non-volatile memory 134. The memory 130 may store commands or data received from the processor 120 or other elements (e.g., the input device 150, the display device 160, an audio module 170, and the like) or generated by the processor 120 or the other elements. The memory 130 may include programming modules 140, such as a kernel 141, a library 143, an application framework 145, an application program 147, and the like. Each of the above-described programming modules may be implemented in software, firmware, hardware, or a combination of two or more thereof.

The input device 150 may include, for example, a microphone, a mouse, or a keyboard. And the input device 150 may include a rotating body. The rotating body may include, for example, a bezel ring, a rotation knob, a wheel or dial.

The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may obtain the sound via the input device 150, or output the sound via a sound output device or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may include, for example, a high definition multimedia interface (HDMI), a universal serial bus (USB) interface, a secure digital (SD) card interface, or an audio interface. A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The rotation detection module 181 may be, for example, an encoder sensor for detecting a plurality of openings formed at regular intervals in the rotating body. According to one embodiment, the rotation detecting module 181 may be an image sensor that detects a specific pattern formed on the rotating body. According to one embodiment, the rotation detection module 181 may provide the rotation parameters of the rotator to the processor 120.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable or a secondary cell which is rechargeable.

The communication module 190 may support establishing a direct (e.g., wired) communication channel or a wireless communication channel between the electronic device #01 and the external electronic device (e.g., the electronic device 102, the electronic device 104, or the server 108) and performing communication via the established communication channel. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the short-range wireless communication network 198 or the long-range wireless communication network 199, using subscriber information (e.g., international mobile subscriber identity (IMSI)) stored in the subscriber identification module 196.

According to an embodiment, commands or data may be transmitted or received between the electronic device 101 and the external electronic device 104 via the server 108 coupled with the long-range wireless communication network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 3A:
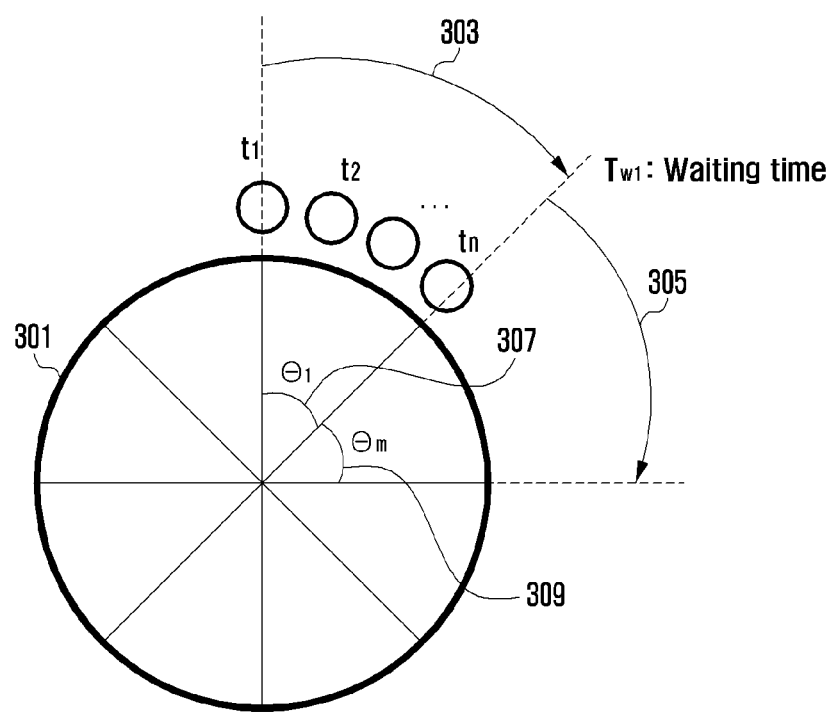
FIGS. 3A to 3C shows an example of generating a vibration pattern using a rotating body according to various embodiments of the present disclosure.
Figure 3B:
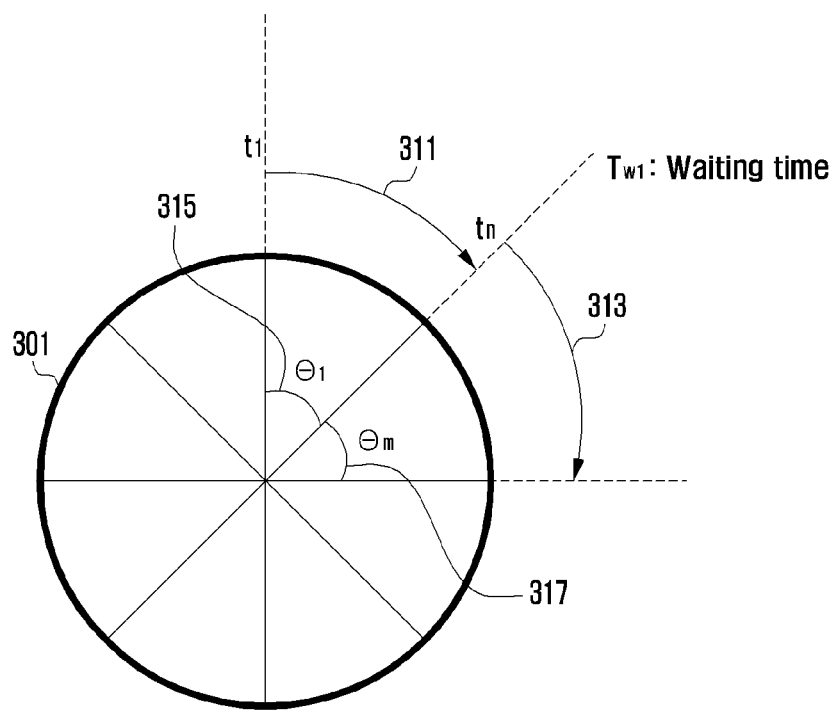
Figure 3C:
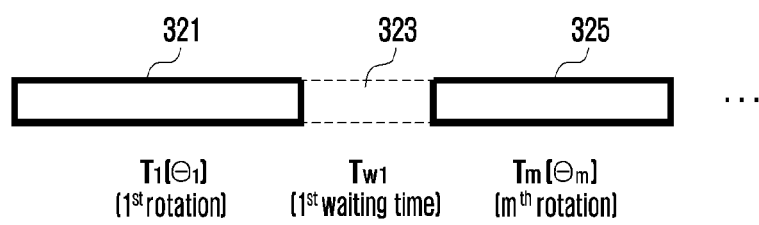

FIGS. 3A to 3C shows an example of generating a vibration pattern using a rotating body according to various embodiments of the present disclosure.

FIG. 3A illustrates a rotating body 301 and click positions t1, t2, . . . , tn that provide a sense of clicking during rotation.

The rotating body 301 can provide a sense of clicking to the user each time it is rotated by a preset angle because of a locking member (not shown) disposed in the housing. The rotating body 301 can output a corresponding signal each time it is rotated one click, and the processor receiving the signal can calculate the rotation angle of the rotating body 301. For example, when the rotating body 301 generates 24 clicks during one rotation, the processor may determine that the rotating body 301 has been rotated 15 degrees for a 1-click rotation. When the rotating body 301 is rotated by n clicks, the processor may receive n pulses, calculate the rotation angle of the rotating body 301 based on the received pulses, and generate vibration parameters that cause the electronic device to vibrate for a time duration corresponding to the rotation angle. That is, the processor may convert the rotation angle of the rotating body into a vibration duration. For example, when the user rotates the rotating body 301 by angle $\Theta_1$ (307), three clicks are generated, and the processor can receive three pulses and determine that the rotating body has been rotated 45 degrees. The processor may generate vibration parameters that cause the electronic device to vibrate for a time duration corresponding to the section (303) in which the rotating body 301 has been rotated.

If the user stops at to click the rotation of the rotating body 301 for time tw1, the processor may generate vibration parameters that cause the electronic device to stop vibrating for time Tw1. When the user rotates again the rotating body 301 by angle $\Theta_m$ (309), the processor may generate vibration parameters that cause the electronic device to vibrate for a time duration corresponding to the rotation section (305).

That is, the processor can determine the rotation angle of the rotating body 301 based on the number of clicks and convert the rotation angle to the time duration for which the electronic device vibrates. The processor can also determine the non-vibration duration based on the time duration for the rotating body 301 stops after rotation.

For example, it is assumed that 24 clicks occur during one rotation of the rotating body 301 and one rotation of the rotating body 301 corresponds to 120 seconds. If the rotating body rotates 3 clicks, stops for 1 second, and rotates 3 clicks again, the processor can generate vibration parameters corresponding to a vibration pattern in which the electronic device vibrates for 15 seconds, stops vibration for 1 second, and vibrates again for 15 seconds.

FIG. 3B shows a rotating body 301 that rotates continuously without clicking. FIG. 3C illustrates vibration patterns 321, 323 and 325 generated by the user.

When the user rotates the rotating body 301 at angle $\Theta_1$ for time T1 (311), the processor can generate vibration parameters that cause the electronic device to vibrate for time T1. That is, the processor may generate the vibration pattern 321 having length T1 according to the rotation of the rotating body 301.

When the user stops the rotation of the rotating body 301 for time Tw1, the processor can stop the vibration of the electronic device for time Tw1 (323).

When the user rotates the rotating body 301 at angle $\Theta_m$ for time Tn (313), the processor can generate vibration parameters that cause the electronic device to vibrate for time Tn. That is, the processor may generate the vibration pattern 325 having length Tm according to the rotation (e.g., angle $\Theta_m$) of the rotating body 301.

The processor can generate a vibration pattern in which the electronic device vibrates for time T1, stops vibration for time Tw1, and vibrates again for time Tm ("vibration for time T1→no vibration for time Tw1→vibration for time Tm").

Specifically, the processor can detect that the rotating body 301 rotates for time T1 (311), stops rotation for time Tw1, and rotates again for time Tn (313) through the rotation detection module and generate a corresponding vibration pattern.

The electronic device can change the vibration parameters in accordance with the direction in which the rotating body 301 is rotated. Specifically, the electronic device can select the vibration frequency based on the rotation direction of the rotating body 301. For example, when the rotating body 301 is rotated in the clockwise direction, the vibration frequency may be set to a first value; and when the rotating body 301 is rotated in the counterclockwise direction, the vibration frequency may be set to a second value.

The electronic device can also change the vibration parameters according to the speed at which the rotating body 301 is rotated. For example, the electronic device can set the level of vibration to a first value when the rotational speed of the rotating body 301 is greater than a preset speed, and set the level of vibration to a second value when the rotational speed of the rotating body 301 is less than or equal to the preset speed.

In addition, the electronic device can change the vibration parameters according to the acceleration at which the rotating body 301 rotates. For example, the electronic device can set the type of vibration to a first value when the rotational acceleration of the rotating body 301 is greater than a preset acceleration, and set the type of vibration to a second value when the rotational acceleration of the rotating body 301 is less than or equal to the preset acceleration.

Figure 4:
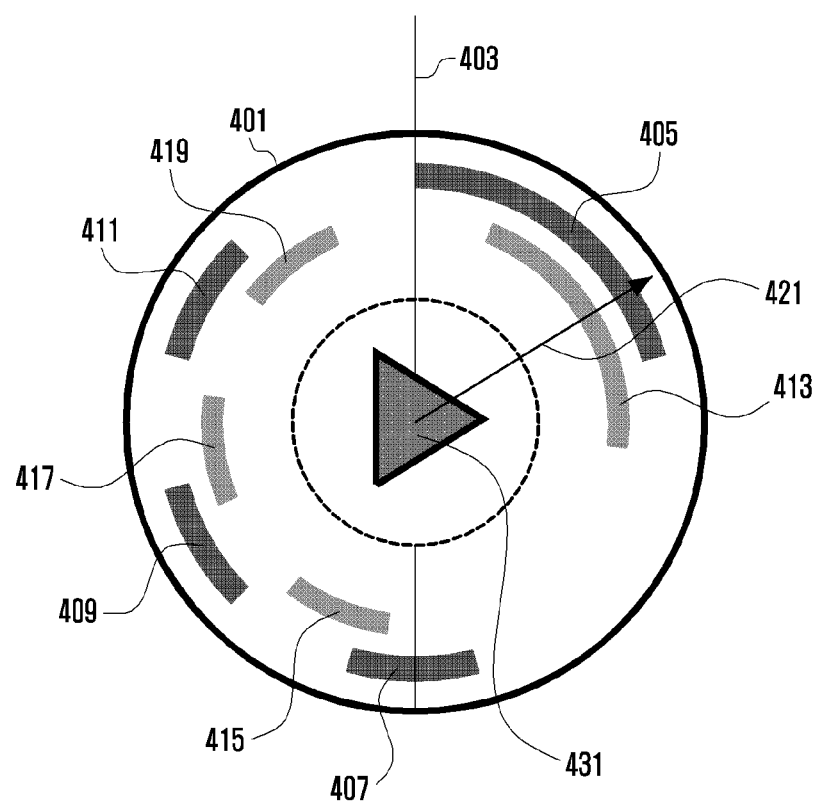
FIG. 4 illustrates a preview of a generated vibration pattern.

FIG. 4 illustrates a preview of a generated vibration pattern.

The preview may correspond to activation of a vibration pattern generated by the user.

FIG. 4 illustrates user interface (UI) elements 405, 407, 409, 411, 413, 415, 417, 419, 421 and 431 output on the display of the electronic device.

The UI elements 405, 407, 409 and 411 correspond to a vibration pattern generated by the user, and may be composed of circular arcs having the same radius. The arcs 405, 407, 409 and 411 represent the sections where vibration occurs. The length of the arcs 405, 407, 409 and 411 may correspond to the duration where vibration occurs. For example, assuming that the total length of the circumference corresponds to 10 seconds, the arc 405 may indicate that vibration occurs for 2 seconds. The arcs 407, 409 and 411 may indicate that vibration occurs for one second. The portion without an arc may indicate a non-vibration section in which no vibration occurs. For example, the section between the arc 405 and the arc 407 is a non-vibration section lasting for 2.5 seconds. The section between the arc 407 and the arc 409 is a non-vibration section lasting for 1 second. The section between the arc 409 and the arc 411 is a non-vibration section lasting for 1 second.

If the length of the vibration pattern exceeds 10 seconds (360 degrees), an arc with a smaller radius can be additionally displayed. For example, the UI elements 413, 415, 417 and 419 are displayed in a circular arc having a smaller radius as the length of the vibration pattern exceeds 10 seconds.

The UI element 431 is a button for starting or stopping a preview of the vibration pattern generated by the user. If the user selects a vibration pattern by touching the button 431, the electronic device may vibrate or not vibrate according to the vibration pattern. The starting point of the vibration pattern is the 12 o'clock direction (403), and the vibration can proceed in the clockwise direction. The UI element 421 may rotate in the clockwise or counterclockwise direction to visually represent the position of the currently active vibration pattern.

The time taken for one rotation of the UI element 421 may be preset or may be determined by the user. For example, assuming that one rotation of the UI element 421 corresponds to 10 seconds, the vibration pattern shown in FIG. 4 may indicate an alternation of vibration and non-vibration such as "vibration for 2 seconds→non-vibration for 2 seconds→vibration for 1 second→non-vibration for 1 second-→vibration for 1 second→non-vibration for 1 second→vibration for 1 second→non-vibration for 2 seconds→vibration for 2 seconds→non-vibration for 2 seconds→vibration for 1 second→non-vibration for 1 second-→vibration for 1 second→non-vibration for 1 second→vibration for 1 second".

The color of the arcs can be displayed in different colors as the radius thereof becomes smaller. For example, the arcs 405, 407, 409 and 411 may be displayed in orange, and the arcs 413, 415, 417 and 419 may be displayed in yellow.

In one embodiment, the thickness of the arc can indicate the strength of vibration. The arc 405 is relatively thicker than the arc 413 and may indicate a stronger vibration.

Figure 5:
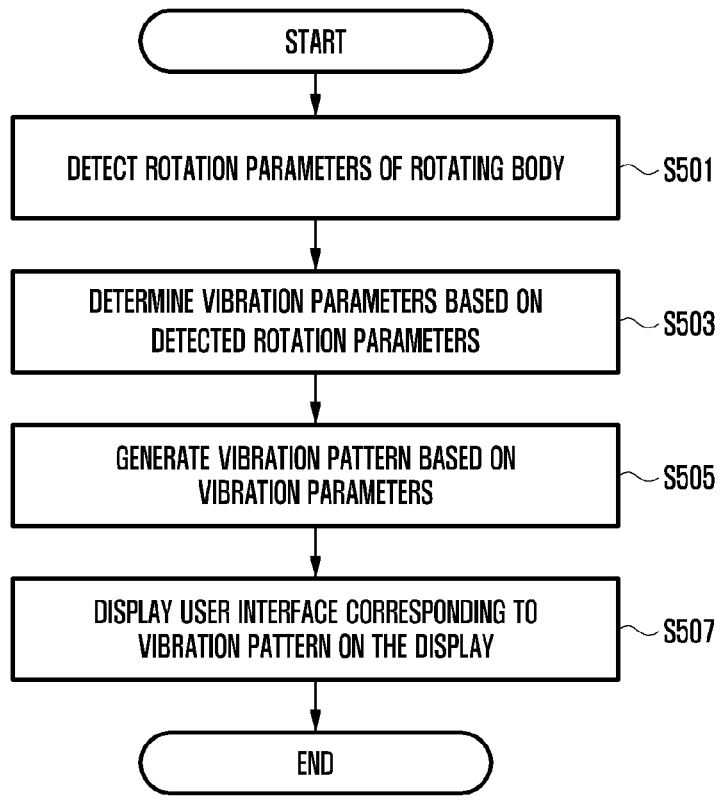
FIG. 5 illustrates a flowchart of a method for generating and previewing a vibration pattern using a rotating body in the electronic device according to an embodiment of the present disclosure.

FIG. 5 illustrates a flowchart of a method for generating and previewing a vibration pattern using a rotating body in the electronic device according to an embodiment of the present disclosure.

With reference to FIG. 5, at operation S501, the electronic device may identify rotation parameters of the rotating body. The rotating body may be, for example, a bezel ring arranged to surround the outer periphery of the display of the electronic device. The display may be circular, and the rotating body may be disposed on the outer circumferential portion of the display and may be rotated along the outer circumference. When the user rotates the rotating body (bezel ring) during vibration pattern generation mode, the rotation detection module of the electronic device can detect the rotation parameters of the rotating body. For example, the rotation parameters may include at least one of the rotation direction, rotation angle, rotational speed, rotational acceleration, and rotation length of the rotating body. The rotating body can rotate and output a signal corresponding to the rotation, and the processor of the electronic device can receive the signal and identify the rotation parameter of the rotating body.

At operation S503, the electronic device may determine the vibration parameters based on the identified rotation parameters. The vibration parameters may include at least one of the vibration duration, vibration strength, vibration type, vibration period, and vibration frequency for the electronic device. The processor can analyze the signal received from the rotating body to identify the rotation parameter, and determine the vibration parameter based on the identified rotation parameter. For example, if the rotation parameter is related to the direction of rotation, the processor may change the frequency of vibration generated by the haptic module according to the direction of rotation.

At operation S505, the electronic device may generate a vibration pattern based on the vibration parameters. After the vibration parameters are determined, the processor of the electronic device may generate a vibration pattern based on the vibration parameters. For example, if the vibration parameter is related to the vibration duration, the processor may generate a vibration pattern by determining the length of vibration and the length of non-vibration corresponding to the vibration parameter. The electronic device can detect the rotation time or duration of the rotating body, and determine the vibration time or duration of the electronic device based on the detected rotation time of the rotating body. That is, the processor of the electronic device can identify the time during which the rotating body rotates and control the haptic module to output vibration for the identified time.

At operation S507, the electronic device may display a user interface (UI) corresponding to the vibration pattern on the display. The user interface may be a graphical object that provides an environment in which the user may interact with the electronic device. The user interface may include, for example, a virtual button that provides information to the user or allows the user to enter a command.

The user interface may provide visual feedback for the vibration pattern generated by the user. For example, the vibration time of the haptic module can be displayed in the form of an arc, and the length of the arc can correspond to the vibration duration.

In one embodiment, the user interface may include a circular arc smaller than the radius of the rotating body, and the vibration time may correspond to the length of the arc. The center of the rotating body and the center of the arc may be identical, and the arc may be displayed as having a smaller radius than that of a virtual circle corresponding to the circumference of the rotating body.

Figure 6A:
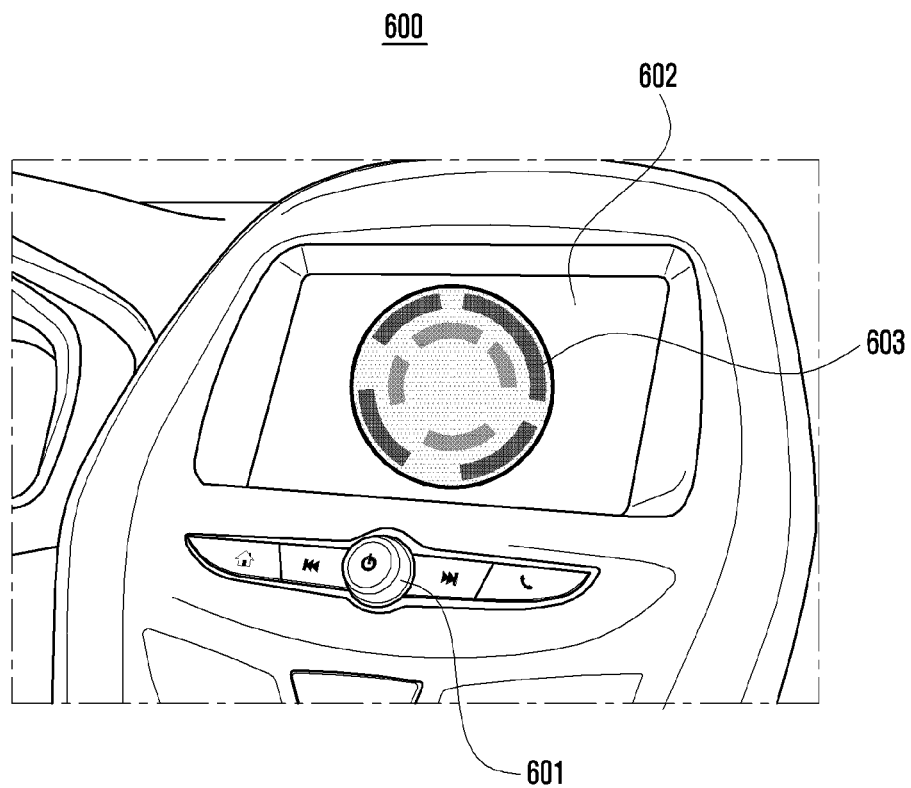
FIGS. 6A to 6C show various types of rotating bodies according to an embodiment of the present disclosure.
Figure 6B:
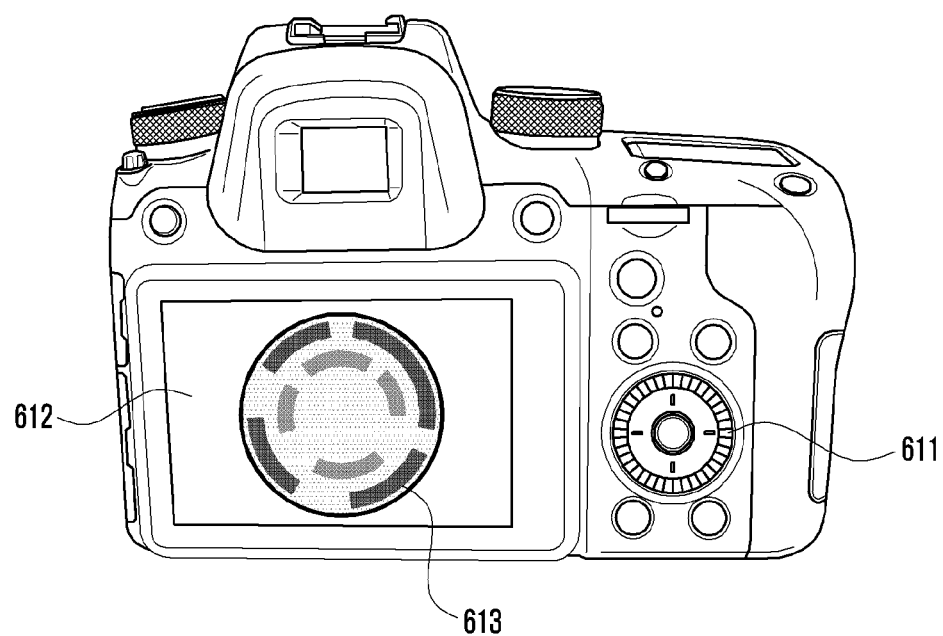
Figure 6C:
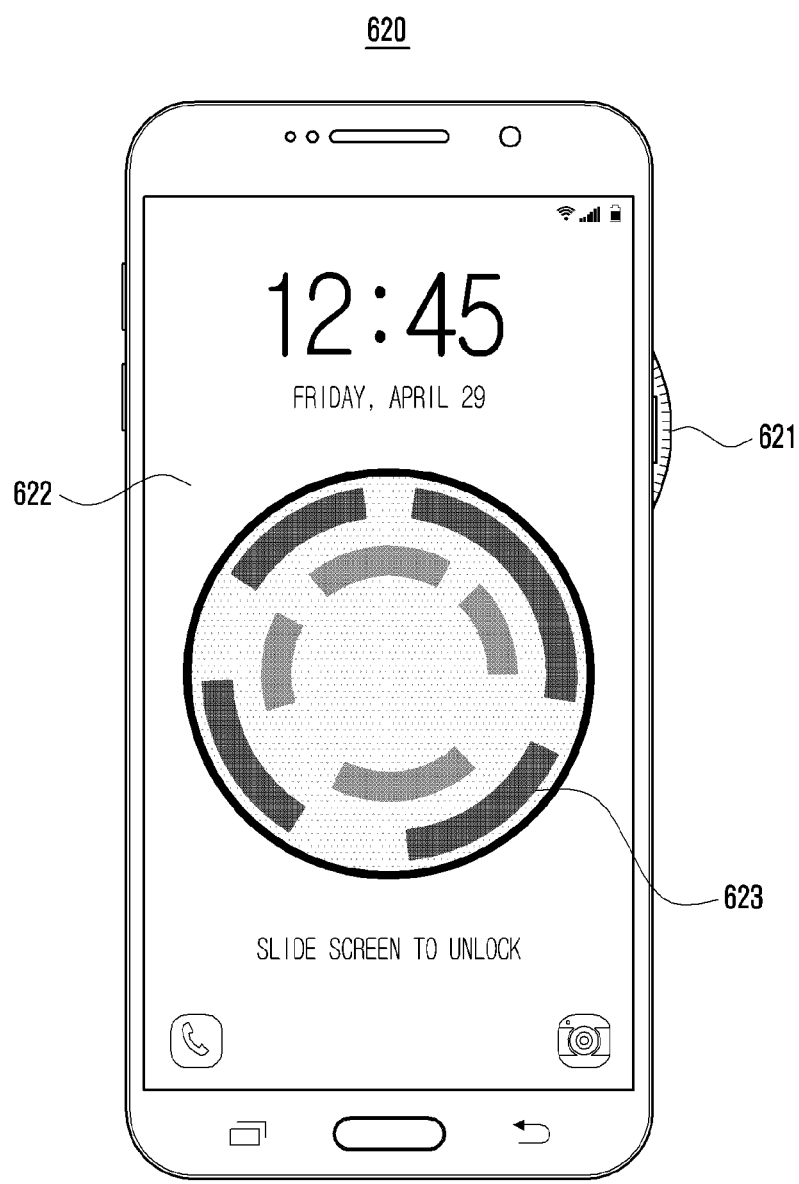

FIGS. 6A to 6C show various types of rotating bodies according to an embodiment of the present disclosure.

FIG. 6A shows an electronic device 600 including a rotating body 601 and a display 602.

The electronic device 600 may be, for example, a control panel mounted on a vehicle.

The rotating body 601 may be a rotation knob.

When the user generates a vibration pattern by rotating the rotating body 601, a user interface 603 corresponding to the generated vibration pattern can be displayed on the display 602.

FIG. 6B shows an electronic device 610 including a rotating body 611 and a display 612.

The electronic device 610 may be, for example, a camera.

The rotating body 611 may be a jog dial.

When the user generates a vibration pattern by rotating the rotating body 611, a user interface 613 corresponding to the generated vibration pattern can be displayed on the display 612.

FIG. 6C shows an electronic device 620 including a rotating body 621 and a display 622.

The electronic device 620 may be, for example, a smartphone.

The rotating body 621 may be a jog dial.

When the user generates a vibration pattern by rotating the rotating body 621, a user interface 623 corresponding to the generated vibration pattern can be displayed on the display 622.

Figure 7:
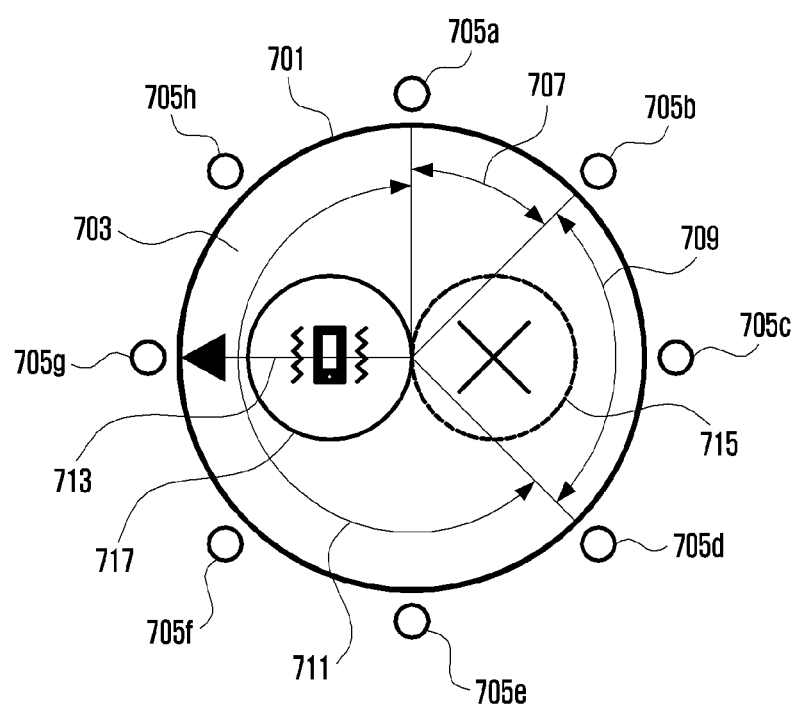
FIG. 7 shows another example of generating a vibration pattern using a rotating body according to various embodiments of the present disclosure.

FIG. 7 shows another example of generating a vibration pattern using a rotating body according to various embodiments of the present disclosure.

In FIG. 7, a rotating body 701, a display 703, and UI elements 713, 715 and 717 are shown.

The rotating body 701 may be configured to provide a feeling of clicking at each of preset angular positions 705a, 705b, 705c, 705d, 705e, 705f, 705g and 705h. In one embodiment, a user interface (not shown) may be displayed at a position of the display 703 corresponding to a preset angular position. The UI element 717 may be a vibration button, the UI element 715 may be a vibration stop button, and the UI element 713 may be an indicator indicating the position of the vibration pattern being currently previewed.

The electronic device can generate a vibration pattern based on the UI elements 717 and 715 and the rotation angle of the rotating body 701. That is, the electronic device may start to vibrate in response to a user input selecting the UI element 717, and may continue to vibrate for a duration corresponding to the rotation angle of the rotating body 701. The electronic device may stop vibrating in response to a user input selecting the UI element 715, and may remain in the non-vibration state for a duration corresponding to the rotation angle of the rotating body 701.

For example, when the user selects the UI element 717 and rotates the rotating body 701 through 45 degrees (707), the electronic device may vibrate for a time duration corresponding to an angle of 45 degrees (707). If one rotation of the rotating body 701 corresponds to two minutes, the electronic device can vibrate for 15 seconds.

When the user selects the UI element 715 and rotates the rotating body 701 through 90 degrees (709), the electronic device may remain in the non-vibration state for a time duration corresponding to an angle of 90 degrees (709). If one rotation of the rotating body 701 corresponds to two minutes, the electronic device can remain in the non-vibration state for 30 seconds.

When the user selects the UI element 717 and rotates the rotating body 701 through 215 degrees (709), the electronic device may remain in the non-vibration state for a time duration corresponding to an angle of 215 degrees (709). If one rotation of the rotating body 701 corresponds to two minutes, the electronic device can vibrate for 75 seconds.

As described above, the user can generate a vibration pattern by using the UI elements 717 and 715 and the rotating body 701, and the electronic device can vibrate for 15 seconds, pause vibration for 30 seconds, and vibrate for 75 seconds according to the vibration pattern. As the generated vibration pattern is activated, the UI element 713 can be rotated about the center of the display like a clock hand. For example, when the vibration pattern is activated, the UI element 713 may start to rotate clockwise from the start position 705a.

In one embodiment, the UI element 717 can operate as a toggle. In this embodiment, upon receiving a user input selecting the UI element 717, the electronic device may enter the vibration mode; upon receiving a user input selecting the UI element 717 again during the vibration mode, the electronic device may stop vibration. Thus, the UI element 715 may become unnecessary.

Figure 8:
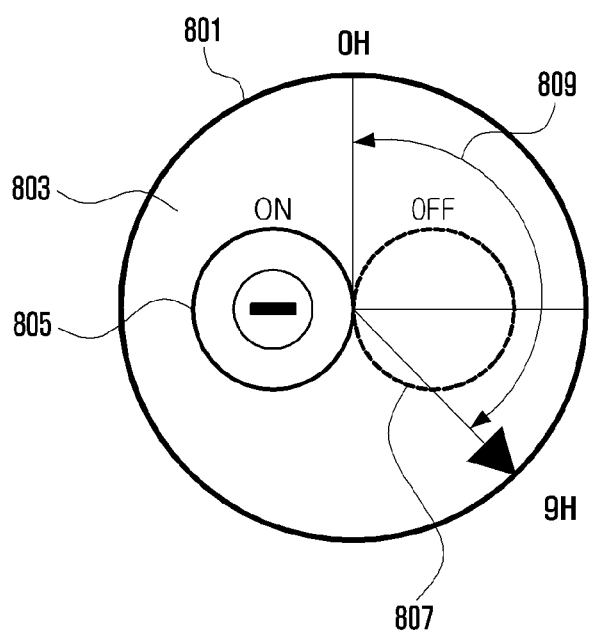
FIG. 8 shows an example of activating or deactivating a specific function of the electronic device for a period of time using a rotating body according to various embodiments of the present disclosure.

FIG. 8 shows an example of activating or deactivating a specific function of the electronic device for a period of time using a rotating body according to various embodiments of the present disclosure.

In FIG. 8, a rotating body 801, a display 803, and UI elements 805 and 807 are shown.

The display 803 may be a circular display. The display 803 may display the UI elements 805 and 807.

The rotating body 801 is disposed at the outer periphery of the circular display, and can be arranged to be rotatable along the outer periphery of the circular display. The rotating body 801 may include a rotation detection module.

The processor of the electronic device is electrically connected with the display 803 and the rotation detection module, and can identify the rotation angle of the rotating body by use of the rotation detection module. The processor can control activating or deactivating a specific function for a time duration corresponding to the rotation angle of the rotating body on the basis of a user input selecting the UI element and the output from the rotation detection module.

One rotation of the rotating body 801 may correspond to a time duration. For example, one rotation of the rotating body 801 may correspond to 24 hours.

The electronic device may activate or deactivate a specific function thereof for a specific time duration based on a user input for selecting the UI element 805 and a user input for rotating the rotating body 801. For example, to enable the user to set the do-not-disturb time, the electronic device may enter the do-not-disturb mode according to a user input for selecting the UI element 805, and may set the do-not-disturb time ranging from 0:00 to 9:00 according to a user input for rotating the rotating body 801 by a given angle (809) and a user input for selecting the UI element 807. In one embodiment, the UI element 805 can operate as a toggle, and thus the UI element 807 may become unnecessary.

Figure 9:
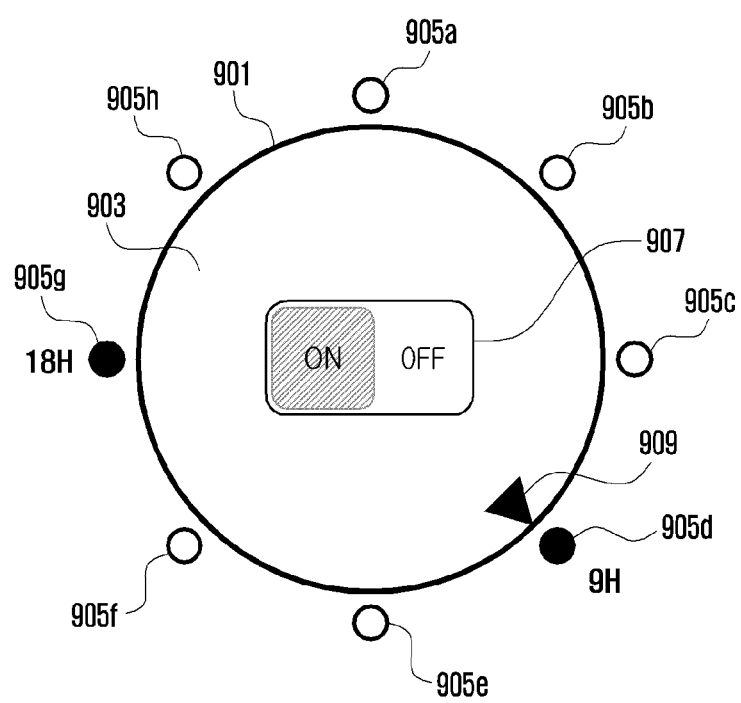
FIG. 9 shows an example of activating a specific function of the electronic device at a specific time using a rotating body according to various embodiments of the present disclosure.

FIG. 9 shows an example of activating a specific function of the electronic device at a specific time using a rotating body according to various embodiments of the present disclosure.

In FIG. 9, a rotating body 901, a display 903, and a UI element 907 are shown.

The display 903 may be a circular display. The display 903 may display the UI element 907.

The rotating body 901 is disposed at the outer periphery of the circular display, and can be arranged to be rotatable along the outer periphery of the circular display. The rotating body 901 may include a rotation detection module.

The processor of the electronic device is electrically connected with the display 903 and the rotation detection module, and can identify the rotation angle of the rotating body by use of the rotation detection module. The processor can control activating a specific function at a time corresponding to the rotation angle of the rotating body on the basis of a user input for selecting the UI element and the output from the rotation detection module.

One rotation of the rotating body 901 may correspond to a time duration. For example, one rotation of the rotating body 901 may correspond to 24 hours. That is, the rotation of the rotating body 901 by a specific angle may correspond to a time duration. The rotation start point 905a of the rotating body 901 may correspond to 0:00 or 24:00. The rotation angle 905b may correspond to 3:00. The rotation angle 905c may correspond to 6:00. The rotation angle 905d may correspond to 9:00. The rotation angle 905e may correspond to 12:00. The rotation angle 905f may correspond to 15:00. The rotation angle 905g may correspond to 18:00. The rotation angle 905h may correspond to 21:00.

The UI element 907 may be in the form of a slide switch. As the slide switch is moved to the left or right, an associated function can be turned on or off.

The electronic device may activate a particular function thereof at a specific time based on a user input for rotating the rotating body and a user input for selecting the UI element 907. For example, when the user rotates the rotating body 901 to the 9 o'clock position 905*d* and drags the UI element 907 to the left, the alarm can be set to 9:00. When the user rotates the rotating body 901 to the 18 o'clock position 905*g* and drags the UI element 907 to the left, the alarm can be set to 18:00. In one embodiment, a figure, letter or number may be displayed at a position of the display 903 corresponding respectively to the angular positions 905*a*, 905*b*, 905*c*, 905*d*, 905*e*, 905*f*, 905*g* and 905*h* of the rotating body. In addition, the figure, letter or number output at the position corresponding to the time of the alarm may be displayed in a visually distinguished manner.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. According to an embodiment, a method according to various embodiments of the disclosure may be included and provided in a computer program product. The computer program product may be traded as a product between a seller and a buyer.

The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such an embodiment, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a wearable electronic device to generate a vibration pattern, the method comprising:
    detecting rotation parameters including a plurality of rotation angles and rotational speeds according to a series of rotations of a rotating body;
    determining, based on the rotation parameters, vibration parameters including a plurality of vibration durations, non-vibration durations and vibration intensities according to the series of rotations;
    generating a vibration pattern based on the vibration parameters; and
    displaying, in response to generating the vibration pattern by the series of rotations, a user interface corresponding to the generated vibration pattern on a display,
    wherein determining vibration parameters comprises:
        determining the plurality of vibration durations corresponding to the plurality of rotation angles while a user interface button is selected;
        determining the plurality of non-vibration durations corresponding to the plurality of rotation angles while the user interface button is not selected; and
        determining the plurality of vibration intensities corresponding to the plurality of rotational speeds; and
    wherein displaying a user interface comprises:
        displaying a plurality of arcs of a circle corresponding to the plurality of rotation angles of the rotating body while the user interface button is selected, wherein a thickness of the arcs correspond to the plurality of rotational speeds of the rotating body.

2. The method of claim 1, wherein:
    the display is circular, and
    the rotating body is disposed at an outer periphery of the display and configured to be rotatable along the outer periphery.

3. The method of claim 2, wherein the user interface includes a plurality of arcs whose radius is smaller than a radius of the rotating body.

4. The method of claim 1, wherein the rotation parameters further include at least one of a rotation direction, rotational acceleration, or rotation length of the rotating body.

5. The method of claim 1, wherein the vibration parameters further include at least one of vibration type, vibration period, or vibration frequency for the electronic device.

6. A wearable electronic device comprising:
    a sensor configured to detect rotation parameters of a rotating body;
    haptic outputting circuitry configured to generate vibration according to a vibration pattern;
    a display;
    a memory; and
    a processor electrically connected with the sensor, the haptic outputting circuitry, the display, and the memory,
    wherein the memory stores instructions that, when executed, cause the processor to:
        detect rotation parameters including a plurality of rotation angles and rotational speeds according to a series of rotations of the rotating body;

determine, based on the rotation parameters, vibration parameters including a plurality of vibration durations, non-vibration durations and vibration intensities according to the series of rotations;

generate a vibration pattern based on the vibration parameters; and control, in response to generating the vibration pattern by the series of rotations, the display to output a user interface corresponding to the generated vibration pattern, wherein determining vibration parameters comprises:

determining the plurality of vibration durations corresponding to the plurality of rotation angles while a user interface button is selected;

determining the plurality of non-vibration durations corresponding to the plurality of rotation angles while the user interface button is not selected; and determining the plurality of vibration intensities corresponding to the plurality of rotational speeds; and wherein displaying a user interface comprises:

displaying a plurality of arcs of a circle corresponding to the plurality of rotation angles of the rotating body while the user interface button is selected, wherein a thickness of the arcs correspond to the plurality of rotational speeds of the rotating body.

7. The electronic device of claim 6, wherein:
the display is circular, and
the rotating body is disposed at an outer periphery of the display and configured to be rotatable along the outer periphery.

8. The electronic device of claim 7, wherein the user interface includes a plurality of circular arcs whose radius is smaller than the radius of the rotating body.

9. The electronic device of claim 6, wherein the rotation parameters further include at least one of a rotation direction, rotational acceleration, or rotation length of the rotating body.

10. The electronic device of claim 6, wherein the vibration parameters further include at least one of vibration type, vibration period, or vibration frequency for the electronic device.

11. A computer program product comprising a non-transitory computer-readable storage medium that stores a program for causing a processor to execute a method for an wearable electronic device to generate a vibration pattern, the method comprising:

detecting rotation parameters including a plurality of rotation angles and rotational speeds according to a series of rotations of a rotating body;

determining, based on the rotation parameters, vibration parameters including a plurality of vibration durations, non-vibration durations and vibration intensities according to the series of rotations;

generating a vibration pattern based on the vibration parameters; and displaying, in response to generating the vibration pattern by the series of rotations, a user interface corresponding to the generated vibration pattern on a display;

wherein determining vibration parameters comprises:

determining the plurality of vibration durations corresponding to the plurality of rotation angles while a user interface button is selected;

determining the plurality of non-vibration durations corresponding to the plurality of rotation angles while the user interface button is not selected; and determining the plurality of vibration intensities corresponding to the plurality of rotational speeds; and wherein displaying a user interface comprises:

displaying a plurality of arcs of a circle corresponding to the plurality of rotation angles of the rotating body while the user interface button is selected, wherein a thickness of the arcs correspond to the plurality of rotational speeds of the rotating body.

12. The computer program product of claim 11, wherein:
the display is circular, and
the rotating body is disposed at an outer periphery of the display and configured to be rotatable along the outer periphery.

13. The computer program product of claim 11, wherein the rotation parameters further include at least one of a rotation direction, rotational acceleration, or rotation length of the rotating body.

14. The computer program product of claim 11, wherein the vibration parameters further include at least one of vibration type, vibration period, or vibration frequency for an electronic device.

\* \* \* \* \*